United States Patent [19]

Charman

[11] Patent Number: 4,666,194
[45] Date of Patent: May 19, 1987

[54] TRUNK LID FASTENING DEVICE FOR AUTOMOBILES

[76] Inventor: John C. Charman, Delaware, Evesham Rd., New End, Redditch, England

[21] Appl. No.: 854,166

[22] Filed: Apr. 21, 1986

[51] Int. Cl.⁴ .............................................. E05C 19/18
[52] U.S. Cl. ................................... 292/288; 292/339; 296/76
[58] Field of Search .............. 292/288, 258, 262, 264, 292/339, DIG. 43, DIG. 60; 70/93; 24/301, 302; 296/37.1, 76

[56] References Cited

U.S. PATENT DOCUMENTS

| | | | |
|---|---|---|---|
| 3,195,940 | 7/1965 | Woodling | 292/262 |
| 3,328,064 | 6/1967 | Simon | 292/288 |
| 3,452,401 | 7/1969 | Trent | 24/301 |
| 4,062,578 | 12/1977 | Chen | 292/262 |
| 4,070,050 | 1/1978 | Glock et al. | 292/339 |
| 4,191,413 | 3/1980 | Barner | 292/262 |
| 4,307,907 | 12/1981 | Barrowman et al. | 292/339 |
| 4,322,103 | 3/1982 | Acton | 292/288 |

FOREIGN PATENT DOCUMENTS 2747096  5/1979  Fed. Rep. of Germany ...... 292/262

Primary Examiner—Robert L. Wolfe
Assistant Examiner—Lloyd A. Gall
Attorney, Agent, or Firm—Leydig, Voit & Mayer

[57] ABSTRACT

A device for fastening the trunk lid or tailgate of an automobile, for example when carrying an oversize load, which prevents the trunk lid or tailgate from being shut properly, comprises a strap adjustable for length and having at one end an openable clasp, similar to those used on dog leads, to engage a striker of the trunk lid or tailgate lock and at the other end a triangular keeper element with cylindrical portions of different diameters.

The triangular keeper can be rotated within a loop of the strap to bring any one of the cylindrical portions into line with the strap. The selected cylindrical portion being that appropriate to be received in and retained by the latching member of the lock.

Instead of the openable clasp illustrated, that end of the strap may be fitted with a plate having a keyhole slot to engage a cantilever striker of the kind with an enlarged head at its free end.

4 Claims, 8 Drawing Figures

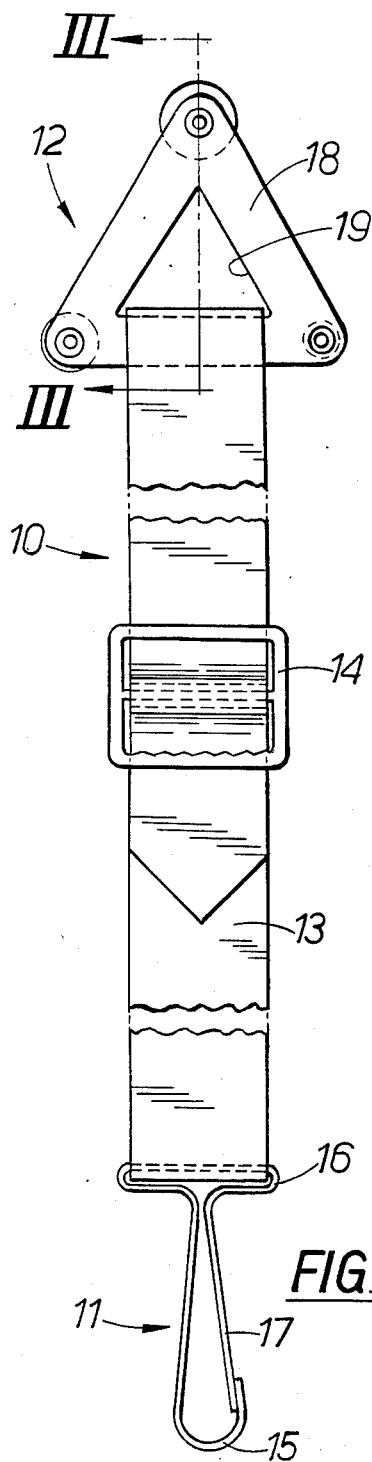
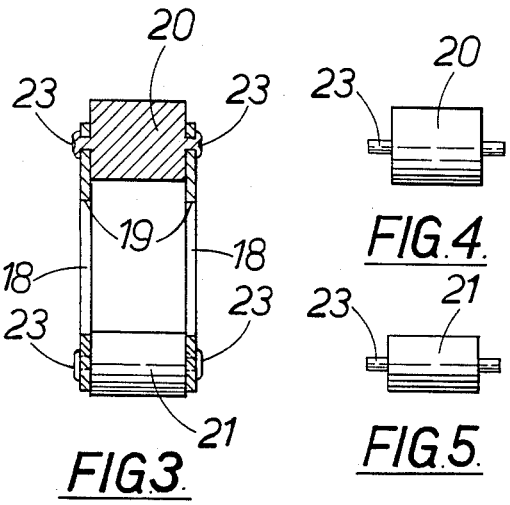
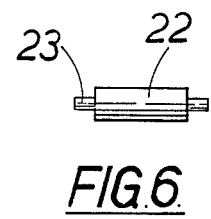
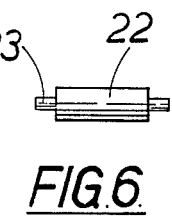
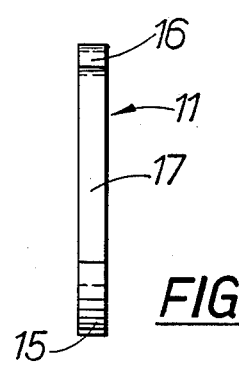
FIG.1
FIG.2
FIG.3
FIG.4
FIG.5
FIG.6

TRUNK LID FASTENING DEVICE FOR AUTOMOBILES

FIELD OF THE INVENTION

This invention relates to a trunk lid fastening device for automobiles. The term trunk lid is used hereinafter to refer not only to trunk lids of sedan or convertible automobiles but also to top-hinged tailgates of automobiles of the station wagon, beach wagon and hatchback, types to all of which the invention is applicable.

BACKGROUND

Oversize loads in the trunk or on the load-carrying platform can prevent the trunk lid from being shut. The lid is often then secured by rope but it is difficult to find anchorage points for the rope which is unsightly and may be unsafe.

The present invention provides a trunk lid fastening device for use in such circumstances which consists in an elongated link adjustable in length and having at one end a releasable fastener adapted to engage a striker of the trunk lid lock of the vehicle and at the other end a keeper element adapted to be received in and retained by the latching member of the trunk lid lock.

In use of the device, after loading the trunk or platform the releasable fastener is engaged with the striker of the trunk lid lock and the keeper element is engaged with the latching member of the trunk lid lock which is then restored to its latching condition. Finally the elongated link is adjusted to the required length which is usually such that the trunk lid is held down against the load.

The elongated link is preferably a strap of webbing or other flexible material with a buckle or other known form of adjustment for the length of the strap.

The releasable fastener may be an openable clasp, for example, of the kind used on dog leads having a hook with a spring-loaded tongue normally closing a gap through which the trunk lid striker can pass when the clasp is engaged therewith. Alternatively the openable clasp may take any other suitable known form of fastening having a closure member capable of positively retaining the device in engagement with the trunk lid striker. For example, it may be like any of the various forms of shackle used in yacht rigging or in the form of a gapped spring ring with a closure loop hinged to the ring on one side of the gap and engageable with a hook formed on the end of the ring at the other side of the gap, the loop being retained in the closed condition by the resilience of the spring ring.

Openable clasps as described above are most suitable for use with strikers which are supported at both ends of the portion normally engaged by the latching member of the trunk lid lock, for example, of staple form or with a pin or bar connecting, and supported by, spaced arms or plates. Sometimes trunk lid locks have cantilevered strikers for example spigots supported at one end only and usually with an enlarged head at the free end. For use with such strikers the releasable fastener may be a fitting such as a plate, sheet metal pressing or plastics moulding, with a shaped aperture, such as a keyhole slot having a portion large enough to allow the head to pass through and a smaller portion held, in use of the device, so as to engage behind the head. Alternatively a releasable fastener in the form of an openable clasp may be provided. The openable clasp may be a closed ring or apertured plate with a detent projecting into the opening of the ring or the aperture and adapted to grip the striker or engage behind a head on the free end of the striker.

The keeper element at the other end of the link member may be a simple ring, for example a D-shaped ring, but preferably includes a keeper portion corresponding to the portion of the striker which is engaged by the latching member of the trunk lid lock.

As trunk lid locks in common use have different sizes of strikers, the keeper element may have keeper portions to suit different locks. In one form the keeper element has three keeper portions of different sizes. The keeper element is movable in relation to the elongated link to bring any one of the keeper portions into a position of use.

BRIEF DESCRIPTION OF THE DRAWINGS

An embodiment of the invention will now be described by way of example with reference to the accompanying drawings in which:

FIG. 1 is a front view of a trunk lid fastening device according to the invention, FIG. 2 is a side elevation of a fitting at one end of the device, FIG. 3 is a section on line III—III in FIG. 1 of a fitting at the other end of the device, FIGS. 4, 5 and 6 show components of the fitting of FIG. 3.

DETAILED DESCRIPTION OF THE PREFERRED EMBODIMENT

Figure 7:
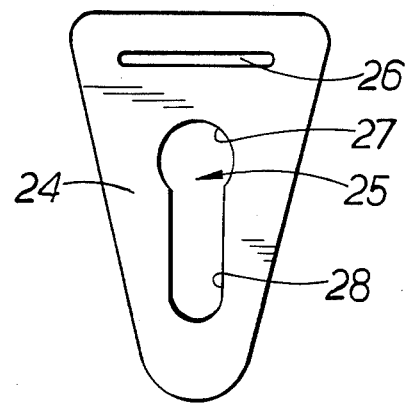
FIG. 7 is a front view of an alternative fitting for the one end of the device.

The trunk lid fastening device shown in the drawings comprises an elongated link 10 adjustable in length, a releasable fastening in the form of an openable clasp 11 (also shown in FIG. 2), at one end of the link and, at the other end of the link, a keeper element 12 (also shown in FIG. 3).

The elongated link 10 is a webbing strap 13 with a buckle 14 at one end. The free end of the strap is threaded through the clasp 11, and the keeper element 12 and the strap formed into a loop by passing the free end through the buckle. The buckle is such that it holds the portion of the strap it engages in its adjusted position. The extent to which the strap is drawn through the buckle determines the size of the loop and provides adjustment for the length of the link.

The openable clasp 11 is made from a length of resilient metal strip forming a hook portion 15, a loop portion 16, through which the strap 13 passes, and a tongue portion 17. The free end of the tongue 17 normally engages the inside of the free end of the hook portion 15 against which it is urged by the resilience of the tongue itself and the loop portion 16. The free end of the tongue can be deflected away from the hook portion 16 to open a gap through which a striker of a trunk lid lock can be passed in use of the device.

The keeper element 12 is an assembly of a pair of triangular plates 18 each with a central triangular opening 19. Pins 20, 21 and 22 (FIGS. 4, 5 and 6) of different diameters but equal length have axial spigots 23 of reduced diameter which project through holes in the apices of the plates 18 and are peened over on the outer faces of the plates 18 to hold the plates spaced apart and secure the assembly. The loop of the strap 13 is passed through the aligned triangular openings 19 of the plates. The different sizes of the pins 20, 21, 22 enable one to be selected which is most suitable to be held by the latching member of the trunk lid latch. The keeper element is rotated through the loop of the strap 13 until the selected pin is furthest away from the strap and the loop engages the side of the opening opposite the selected pin.

In use of the device, after the trunk has been loaded, the openable clasp 11 is hooked onto the striker of the trunk lid lock of the vehicle. The selected pin of the keeper element 12 is offered up to the trunk lid lock which is operated to admit the keeper element and so that its latching member retains the keeper element securely. The length of the loop of the strap 13 is adjusted to bring the trunk lid down onto the load and hold the trunk lid as nearly closed as possible in the circumstances.

Instead of a simple length formed into a continuous loop of strapping 13, separate lengths of strapping may be provided to be joined by the buckle 14. One length is secured to the openable clasp 11 and the other to the keeper element by loops formed in the ends of the lengths of strapping. The loop for the keeper element must be large enough for the keeper element to be rotated as described to bring the selected pin to the operative position.

The pins of the keeper element instead of having integral spigots 23 may have axial internally threaded holes to receive screws to secure the plates 18. Alternatively the plates 18 may be secured by long rivets passing through axial bores in the pins 20, 21, 22.

The alternative fitting shown in FIG. 7 for the one end of the device is intended for use with a trunk lid lock having a cantilevered striker supported at one end only and with an enlarged head at the free end. This alternative fitting has a body 24 made as a sheet metal stamping with a keyhole aperture 25 to engage the striker and a slot 26 for the strap 13. The keyhole aperture 25 has, at the end nearest the slot 26, a portion 27 large enough to pass over the head of the striker and a narrower slot portion 28 wide enough to receive the shank of the spigot but not the head. The fitting of FIG. 7 can be engaged with a striker while the strap 13 is slack. When the strap is taut the striker is kept in the narrow portion 28 of the keyhole aperture where it is prevented from becoming detached from the striker by engagement of the body 24 behind the head of the striker. To suit a variety of sizes of striker, the slotted portion 28 may be tapered but is preferably stepped, having a narrower part or progressively narrower parts towards the end of the portion 28 away from the portion 27.

Figure 8:
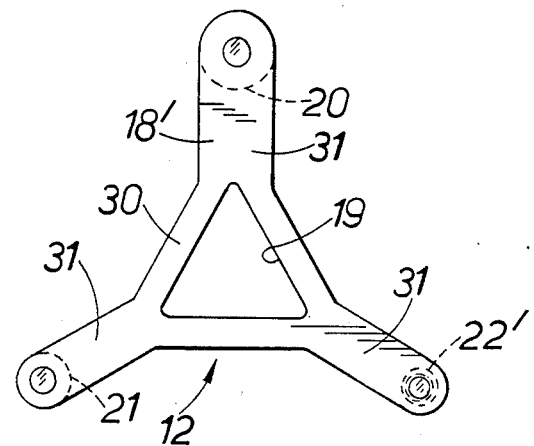
FIG. 8 is a front view of a modified fitting for said other end of the device.

The modification shown in FIG. 8 relates to the keeper element 12 of the trunk lid fastening device. The keeper element of FIG. 8 is still of generally triangular shape and its construction is basically similar to that of FIGS. 1 and 3 to 6, the same reference numerals being applied to similar components of both embodiments. Side plates 18' have a central portion 30 which is of the general form of the triangular plates 18 shown in FIG. 1 with a central triangular aperture 19 through which to thread a loop of the strap 13 but the pins 20, 21 and 22', that secure the assembly and form keeper portions, though still at the apices of the triangular keeper are at the outer ends of arms 31 extending from the apices of the central portion 30. This arrangement facilitates the insertion of the keeper element into engagement with the latching member of the trunk lid latch and its use with a wider range of automobile trunk lid latches.

To facilitate use of the device of FIG. 8 with certain types of trunk lid latches, the smallest pin 22' has a reduced diameter portion lying between portions adjacent the arms 31 which are similar in diameter to the plain, cylindrical pin 22 of FIG. 6.

I claim:

1. A device for fastening the trunk lid or tailgate of an automobile in circumstances, such as the carrying of oversize loads, which prevent the trunk lid or tailgate from being shut normally, which comprises a strap of flexible material and means for adjusting the length of the strap, the strap having at one end a releasable fastener adapted to engage a striker of the trunk lid lock of the vehicle and at the other end a keeper element adapted to be received in and retained by the latching member of the trunk lid lock, said keeper element comprising a pair of spaced plates and a plurality of keeper portions of different diameters disposed between said plates suited for engagement by different trunk lid locks, a respective one of the keeper portions corresponding to the portion of the striker which is to be engaged by the latching member of the respective trunk lid lock, and the keeper element being so secured to the strap as to be rotatable with respect to the strap to enable a selected keeper portion to be brought to an operative position to be received in and retained by the latching member of the trunk lid lock.

2. A device according to claim 1 wherein said plates have aligned openings through which a loop formed by the strap passes.

3. A device according to claim 2 wherein the aligned openings are polygonal with a straight side of the opening opposite an associated keeper portion.

4. A device according to claim 3 wherein the keeper element is triangular and the keeper elements are at the apexes of the triangle.

* * * * *